United States Patent Office 3,327,729
Patented June 27, 1967

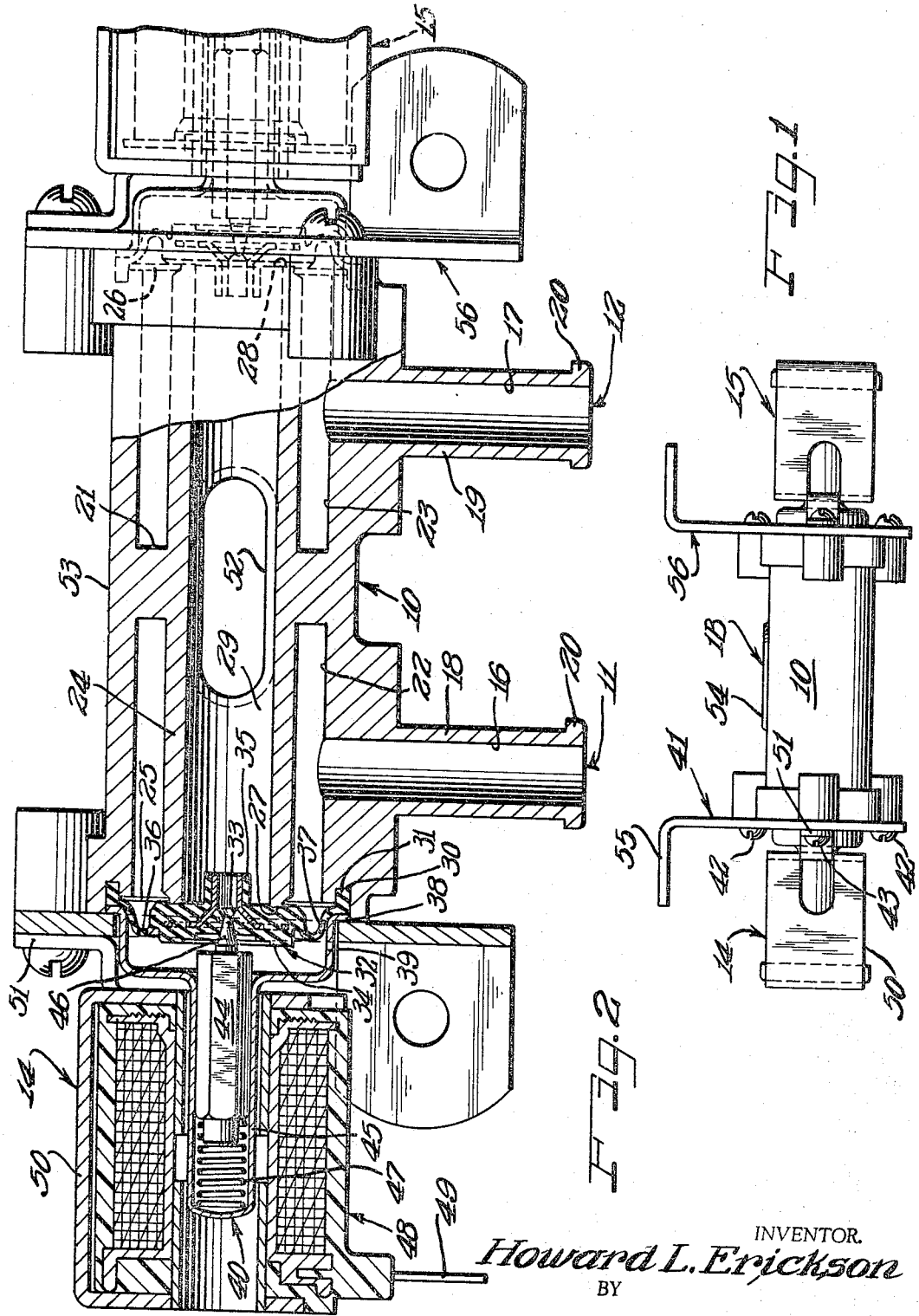

3,327,729
DIRECT FILL VALVE
Howard Lee Erickson, Bensenville, Ill., assignor to The Dole Valve Company, Morton Grove, Ill., a corporation of Illinois
Filed Sept. 17, 1964, Ser. No. 397,224
3 Claims. (Cl. 137—343)

The present invention relates to fluid control valves and more particularly relates to a novel fluid mixing valve which is particularly suited for use in controlling the flow of water to the clothes bin of a washing machine and which is designed to be rigidly mounted in a position in the machine directly over the clothes bin such that water can be dispensed to the bin directly from the valve rather than through the usual hose which, by its nature, is subject to leakage.

By the present invention, the necessity for the usual valve-to-tub hose connection is obviated and, in addition, the unique design assures a full, well mixed flow of water from the valve.

It is therefore an object of the present invention to provide a novel fluid mixing valve which is particularly designed to be rigidly mounted over the tub of a washing machine so that water flowing through the outlet of the valve will flow directly into the tub.

It is another object of the present invention to provide a fluid mixing valve which comprises an elongated valve body having hot and cold operating valves at each end thereof and an elongated outlet opening through the side wall thereof and disposed with its longitudinal axis in parallel with the longitudinal axis of the valve body so that a full, well mixed flow of water will flow from the valve.

These and other objects, advantages, and features of the present invention will become apparent from time to time as the following specification proceeds and with reference to the accompanying drawings, wherein:

FIGURE 1 is a side elevational view of a fluid mixing valve constructed in accordance with the principles of the present invention; and FIGURE 2 is a vertical sectional view through the valve shown in FIGURE 1 but, for the sake of clarity, showing some parts in side elevation and others in broken lines.

The fluid mixing valve shown in the drawings includes a substantially cylindrical elongated valve body 10 having hot and cold water inlets 11 and 12, respectively, and an outlet 13 opening from the side wall of the cylindrical valve body 10. Hot and cold solenoid assemblies 14 and 15 extend outwardly from the left and right hands of the valve body 10 and are used for controlling the flow of hot and cold water through the valve.

Hot and cold inlet passageways 16 and 17 are formed within outwardly extending connecting nipples 18 and 19 which are formed integrally with the valve body and which have outturned flanges 20 at their outermost ends to assure fluid tight connection with the hot and cold water supply hoses. The passageways 16 and 17 open to annular passages 22 and 23, respectively, which are formed within the valve body coaxially of the center axis of the cylindrical valve body 10 and which are separated from one another by an annular web 21 which is integral with the valve body. A cylindrical wall 24 extends from one open end 25 of the valve body to the opposite open end 26 thereof. The wall 24 terminates in lips 27 and 28 at the opposed open ends of the valve body and serves to define a cylindrical mixing chamber 29.

It will be understood that the valving mechanism at the left or hot end of the valve body is identical to that which is employed at the right end thereof and for that reason the "hot" valving mechanism only will be discussed; it being understood that like parts at the opposite end of the valve body operate in a like manner to control the flow of cold water through the valve.

An annular groove 30 is formed at the left hand end of the valve body 10 in surrounding relationship to the hot annular passage 22 and serves to confine the peripheral bead 31 of a flexible rubber diaphragm 32 therein. The diaphragm 32 is of the well known type including a center orifice 33 formed through the thickened portion 34 of the diaphragm and extending through the outwardly extending grommet 35 and having at least one bleed orifice 36 formed within the relatively thin web section 37 thereof. The operation of such diaphragms is so familiar that it need not here be explained except to state that upon closure of the central orifice 33 the thickened portion 34 of the diaphragm will seat on the annular lip 27 to shut off the flow of water from the annular passage 22 to the outlet passageway 29 and that when the central orifice 33 is opened the diaphragm will be unseated from the lip 27 by the differential in fluid forces acting across the diaphragm to thereby communicate the inlet passage 22 to the outlet passageway 29.

The outturned lip 38 of the radially enlarged section 39 of armature guide 40 is seated on top of the periphery of the diaphragm 32 to maintain the bead 31 within the channel groove and is itself maintained in the illustrated position by a mounting plate 41 which is, in turn, fixedly attached to the left end of the valve body by a plurality of screws 42, 43 having their headed ends lying on the outer surface of the plate 41 and their shanks screw-threaded into the valve body 10.

An armature 44 is hexagonally configurated and is slidably mounted within the tubular guide section 45 of the armature guide 40 and has a pointed valve head 46 formed on the innermost end thereof which is cooperable with the central orifice 33 in the diaphragm 32 to control the flow of fluid therethrough. The armature 44 is biased toward the right as viewed in the drawing by compression spring 47 so that the valve head 46 is spring biased to a seated position.

A spool-wound encapsulated coil 48 having terminals 49 extending therefrom, is press-fitted within a metallic C-frame 50 and the entire assembly fits over the tubular guide portion 45 of the armature guide 40 and is maintained in its illustrated position by means of an outturned tab 51 which is maintained in juxtaposition to mounting plate 41 by means of the headed screw 43.

An elongated outlet opening 52 is formed through the side wall 53 of the valve body 10 so that its longitudinal axis lies parallel to the longitudinal axis of the outlet passageway 29 and the generally cylindrical valve body. A barrier wall having substantially the same configuration as the outlet opening 52 leads from the outlet passageway 29 to the outer side wall 53 of the valve body 10 and thus breaks through the annular web 29 and prevents any fluid communication between water flowing through the outlet opening and water within the inlet passages 22, 23.

A very slight and nearly flush raised lip 54 is formed on the outer surface of the side wall 53 of the valve body 10 in surrounding relationship to the outlet opening 52 but there is no connecting nipple or elongated extension or boss extending from the valve body to define the outlet. The configuration results in a good mixing action so that the hot and cold water is thoroughly mixed before it falls onto the clothes within the clothes basket and a full free flow of liquid is provided.

It will be observed that the mounting plate 41 has an outturned end 55 bent away therefrom and that a like configurated bracket 56 is mounted on the opposite or right hand end of the valve body so that the valve body can be rigidly mounted on the washing machine immediately above the clothes basket by two spaced separate mounting brackets.

It will be understood that this embodiment of the present invention has been used for illustrative purposes only and that various modifications and variations in the invention may be effected without departing from the spirit and scope of the novel concepts thereof.

What I claim is:
1. A fluid control valve comprising
   an elongated valve body having a side wall and having hot and cold fluid inlets leading thereinto, coaxial axially spaced hot and cold annular passageways formed within said valve body and leading to opposite ends thereof and communicable with said hot and cold fluid inlets, respectively,
   a cylindrical mixing chamber formed concentrically of and within said annular passageways and opening to opposite ends of said valve body,
   lips formed about and defining the ends of said cylindrical mixing chamber,
   valve members cooperate with said lips to control fluid flow therepast,
   means for actuating said valve members and closing the ends of said valve body, and
   an elongated outlet opening formed within said side wall of said body centrally of the said ends thereof having its longitudinal axis parallel to the longitudinal axis of said mixing chamber,
   wherein said outlet opening is formed substantially flush with the said side wall of said valve body.
2. A fluid control valve comprising
   an elongated and generally cylindrical valve body having a side wall and having an outlet passageway extending therethrough along the longitudinal axis thereof and opening to opposite ends of the valve body,
   hot and cold annular inlet passages formed concentrically of and in surrounding relationship to said outlet passageway and opening to the said ends of said valve body,
   a web wall dividing said passages from one another in axially displaced relation,
   valve seats formed on said valve body in surrounding relationship to said outlet passageway and at each end of the said valve body,
   means closing the said ends of said valve body and providing communication between said inlet passages and said outlet passageway,
   separate mounting brackets secured to said valve body at the said ends thereof,
   valve means cooperable with said seats to control the flow of water between said passages and said outlet passageway,
   means communicating hot and cold water under pressure to said hot and cold inlet passages, and
   an elongated outlet opening formed in the said valve body intermediate the said ends thereof substantially flush with the said side wall thereof,
   wherein the longitudinal axis of said outlet opening lies parallel to the longitudinal axis of said outlet passageway.
3. A fluid control valve constructed in accordance with claim 2, wherein a low lying ridge extends from and is formed integrally with the said side wall of said valve body in surrounding relationship to the said outlet opening.

References Cited
UNITED STATES PATENTS

| | | | |
|---|---|---|---|
| 2,837,282 | 6/1958 | Budde | 137—604 X |
| 3,001,717 | 9/1961 | Rimsha et al. | 137—606 X |
| 3,045,462 | 7/1962 | Brown | 68—207 X |
| 3,135,280 | 6/1964 | Kozel | 137—606 X |
| 3,140,727 | 7/1964 | Cutler | 137—606 |
| 3,167,091 | 1/1965 | Holdren | 137—606 X |
| 3,260,278 | 7/1966 | Lund et al. | 137—343 |

FOREIGN PATENTS

| | | |
|---|---|---|
| 607,361 | 8/1960 | Italy. |

M. CARY NELSON, *Primary Examiner.*

S. SCOTT, *Assistant Examiner.*